(12) United States Patent
Ronin

(10) Patent No.: US 9,034,101 B2
(45) Date of Patent: May 19, 2015

(54) METHOD FOR MANUFACTURING OF SUPPLEMENTARY CEMENTITIOUS MATERIALS (SCMS)

(75) Inventor: Vladimir Ronin, Luleå (SE)

(73) Assignee: PROCEDO ENTERPRISES ETABLISSEMENT, Vaduz (LI)

( * ) Notice: Subject to any disclaimer, the term of this patent is extended or adjusted under 35 U.S.C. 154(b) by 108 days.

(21) Appl. No.: 13/418,729

(22) Filed: Mar. 13, 2012

(65) Prior Publication Data

US 2013/0233208 A1     Sep. 12, 2013

(30) Foreign Application Priority Data

Mar. 12, 2012   (SE) ...................................... 1250225

(51) Int. Cl.

| | |
|---|---|
| B02B 5/02 | (2006.01) |
| B02C 19/00 | (2006.01) |
| B02C 17/00 | (2006.01) |
| B02C 17/02 | (2006.01) |
| B02C 7/00 | (2006.01) |
| C04B 7/00 | (2006.01) |
| C04B 14/00 | (2006.01) |
| C04B 7/52 | (2006.01) |
| C04B 7/13 | (2006.01) |
| C04B 14/06 | (2006.01) |
| C04B 14/08 | (2006.01) |
| C04B 14/14 | (2006.01) |
| C04B 18/08 | (2006.01) |
| C04B 20/00 | (2006.01) |
| C04B 20/02 | (2006.01) |
| C04B 28/04 | (2006.01) |

(52) U.S. Cl.
CPC . *C04B 7/13* (2013.01); *C04B 14/06* (2013.01); *C04B 14/08* (2013.01); *C04B 14/14* (2013.01); *C04B 18/08* (2013.01); *C04B 20/008* (2013.01); *C04B 20/026* (2013.01); *C04B 28/04* (2013.01)

(58) Field of Classification Search
USPC ................ 106/626, 631, 633, 636, 694, 816; 241/14, 24.1, 27, 29, 30; 13/626, 631, 13/633, 636, 694, 816
See application file for complete search history.

(56) References Cited

U.S. PATENT DOCUMENTS

| | | | |
|---|---|---|---|
| 7,669,790 B2 * | 3/2010 | Ronin et al. ..................... | 241/22 |
| 2003/0131764 A1 | 7/2003 | Lessard et al. | |
| 2009/0121052 A1 * | 5/2009 | Ronin et al. ..................... | 241/22 |
| 2010/0243771 A1 | 9/2010 | McKee | |
| 2010/0313795 A1 * | 12/2010 | Guynn et al. ................. | 106/706 |

FOREIGN PATENT DOCUMENTS

WO      2009064244 A1     5/2009

OTHER PUBLICATIONS

Hanna K M et al.: "Some Factors Affecting Strength Development in Pozzolanic Portland Cement" 109 Jahrg Sprechsaal, pp. 440-446.
Pavlidou, E, "Systematic analysis of natural pozzolans from Greece suitable for repair mortars", J. Therm Anal. Calorim, 2012, vol. 108, pp. 671-675.
Juhasz, Zoltan A., Chemical Abstracts, XP001325829.
International Search Report, dated Jul. 5, 2013, from corresponding PCT application.

* cited by examiner

*Primary Examiner* — Kaj K Olsen
*Assistant Examiner* — Karam Hijji
(74) *Attorney, Agent, or Firm* — Young & Thompson

(57) ABSTRACT

The method includes subjecting the pozzolans in crushed state to a high energetic mechanical processing by grinding in a grinding equipment, whereby the pozzolan particles receive mechanical impulses, and the grinding is carried out for a predetermined time resulting in a compressive strength of a 2 inch side cube of mortar having 80% Portland cement and 20% natural pozzolan in a ratio of 1:2.75 to standard sand and in addition water required to obtain a flow of the mortar according to American standard ASTM C 109, which has been properly compacted under vibration and hardened at +20° C. in sealed condition, which after 28 days is ≥75% of the compressive strength of a 2 inch side cube, treated as the cube, of a mortar having a ratio of Portland cement:sand of 1:2.75 and water corresponding to 48.5% of the weight of Portland cement.

20 Claims, No Drawings

METHOD FOR MANUFACTURING OF SUPPLEMENTARY CEMENTITIOUS MATERIALS (SCMS)

BACKGROUND OF THE INVENTION

1. Field of the Invention

The present invention relates to a method for manufacturing of supplementary cementitious materials (SCMs), i.e pozzolans.

2. Description of the Related Art

Fly ash is a supplementary cementitious material, which is useful for production of concretes, mortars and other mixtures comprising cement. Fly ash is a by-product of coal burning power plants and is produced worldwide in large quantities each year.

In the Swedish patent No 532790 a method is described which eliminates fluctuations in the fly ash quality due to variations in the coal chemical compositions and parameters of coal burning processes. Processing of pozzolans, i.e. fly ashes according to the patented method significantly improves performance of the concrete and provides higher level of replacement of Standard Portland cement, which leads to significant economical and environmental benefits.

Fly ash usually contains about 85% glassy, amorphous components in the form of cenosphere particles. According to ASTM C 618 fly ash is classified in two classes, Class C and Class F. The Class F fly ash typically contains more than 70% by weight of silica, alumina, and ferric oxides, while Class C typically contains between 70% and 50%. Class F is produced as a by product of the combustion of bituminous coal. Class C fly ash has a higher calcium content and is produced as a by-product of the combustion of sub-bituminous coal.

Comprehensive research has demonstrated that a high volume fly ash concretes, where Portland cement has been replaced by fly ash to a level over 50% showed a higher long term strength development, a lower water and a gas permeability, a high chloride ion resistance, etc. in comparison with Portland cement concretes without fly ash.

At the same time a high volume fly ash concrete has significant drawbacks. One drawback is long setting times and unsatisfactory slow strength development during the period 0 to 28 days. These negative effects significantly reduce the level of fly ash used for replacement of Portland cement, e.g. about 15% in the US.

Serious problems are also related to the stability of fly ash performance. Usually variations in the chemical composition of coal and frequent changes in operating parameters of power plants cause, among others, formation of crystalline and quasi-crystalline phases, so called scoria, which leads to reduction in fly ash reactivity, so called pozzolanic activity.

Historically limestone-pozzolan mixes have been used for 2000 years ago by ancient Romans and a lot of ancient buildings as e.g. Coliseum are still in a good shape. At the same time despite the fact that according to the US Geological Survey billions of tons of natural pozzolan can be found in Western USA and in most other regions of the world. The usage of natural pozzolans in concrete in the modern building industry is very limited.

Natural pozzolans belong to materials of volcanic origin and sedimentary origin, such as diatomaceous earth. According to ASTM C 618 they are designated Class N pozzolans. The natural pozzolans are described in ACI 232.1R-00 as "Raw or calcinated natural pozzolans that comply with the applicable requirements for the class herein, such as some diatomaceous earth; opaline chert and shales; tuffs and volcanic ashes or pumicites, any of which may or may not be processed calcinations; and various materials requiring calcination to induce satisfactory properties, such as some clays or shales."

The reason why the use of natural pozzolans is very limited can be explained by the following.

The microstructure of natural pozzolan particles is characterized by high porosity, which significantly increases water demand of concrete mixes containing natural pozzolans to achieve required flowability/workability of the concrete. However, increases in water demand lead to unsatisfactory compressive strength development.

Additionally uneven distribution of active minerals i.e. amorphous materials, e.g. due to weathering has a further and unacceptable negative impact on negative strength development of concrete with natural pozzolan content.

Optimized natural pozzolan particle size distribution is required in order to achieve consistent performance of high pozzolan containing concrete. An optimized particle distribution is such that there are fine and coarse fractions present.

According to the Report of American Concrete Institute ACI 232.1R-00 "Use of raw or processed natural pozzolans in concrete", properties of natural pozzolans can vary considerably, depending on their origin and therefore variable proportions of chemically active minerals. Chemically active minerals usually contain amorphous materials (e.g. amorphous silicon dioxide), which react with calcium hydroxide released during Portland cement hydration (pozzolanic reaction) and form calcium-silicate-hydrate gel [C—H—S gel]—a product similar to the resulting product of Portland cement hydration.

SUMMARY OF THE INVENTION

The present invention solves the problem of using natural pozzolans in concrete.

The present invention thus refers to a method for manufacturing of supplementary cementitious materials for replacement of Portland cement in production of mortars and concretes, where the cementitious materials comprises natural pozzolans in the form of rocks and ashes and sedimentary origin, such as diatomaceous earth.

The invention is characterized in, that the said pozzolans in crushed state are subjected to a high energetic mechanical processing by means of grinding in a grinding equipment, whereby the pozzolan particles receive mechanical impulses, and in that the grinding is carried out for a predetermined time resulting in a compressive strength of a 2 inch side cube of mortar comprising 80% Portland cement and 20% natural pozzolan in a ratio of 1:2.75 to standard sand and in addition water required to obtain a flow of the mortar according to American standard ASTM C 109, which has been properly compacted under vibration and hardened at +20° C. in sealed condition, which after 28 days is ≥75% of the compressive strength of a 2 inch side cube, treated as said cube, of a mortar comprising a ratio of Portland cement:sand of 1:2.75 and in addition water corresponding to 48.5% of the weight of Portland cement.

This test corresponds to the American standard ASTM C 109.

DETAILED DESCRIPTION OF THE INVENTION

The present invention will be described in more detail below.

The invention refers to a method for manufacturing of supplementary cementitious materials for replacement of Portland cement in production of mortars and concretes, where the cementitious materials comprises natural pozzolans in the form of rocks and ashes of volcanic origin and sedimentary origin, such as diatomaceous earth.

According to the invention the said pozzolans in a crushed state are subjected to a high energetic mechanical processing by means of grinding in a grinding equipment, whereby the pozzolan particles receive mechanical impulses.

The grinding leads to modification of its surface properties in the form of surface porosity reduction and improvement of its chemical reactivity with alkaline medium produced by hydrating cement. It has been observed that the treatment of the pozzolan particles gives that there occurs local melting of the surface of the particals, whereby zones with a high degree of amorphization are created. By this treatment it has shown that natural pozzolans show a surprisingly good effect when the so treated natural pozzolans replace Some of the amount of Portland cement in a cement paste, mortar and concrete comprising Portland cement, pozzolans, sand and water.

Further according to the invention, the grinding is carried out for a predetermined time resulting in a compressive strength of a 2 inch side cube of mortar comprising 80% Portland cement and 20% natural pozzolan in a ratio of 1:2.75 to standard sand and in addition water required to obtain a flow of the mortar according to American standard ASTM C 109, which has been properly compacted under vibration and hardened at +20° C. in sealed condition, which after 28 days is ≥75% of the compressive strength of a 2 inch side cube, treated as said cube, of a mortar comprising a ratio of Portland cement:sand of 1:2.75 and in addition water corresponding to 48.5% of the weight of Portland cement.

The amount of water required to obtain a flow of the mortar according to ASTM C 109 may vary, but is approximately 40%-50% of the weight of Portland cement and the pozzolan.

The compressive strength when using natural pozzolan corresponds to the strength which is obtained when fly ash is used together with Portland cement.

The present invention can be realized with the use of different types of grinding equipment such as media milling equipment, e.g. stirred, centrifugal, tumbling ball or non-media milling equipment, e.g. jet, impact, roller with dominating shear mechanical impulses applied to the particles subjected to processing and combined with air classification.

The pozzolan can be subjected to grinding in a grinding equipment, which is adopted to the open or closed circuit for material being grinded.

A preferred particle size distribution is:
≤5 microns 15-50%,
≤10 microns 30-65%,
≤30 microns 90-95%.

According to a preferred embodiment Portland cement, fly ash Class F or C, fine quartz, granite quarry fines, fine fractions of recycled concrete or blast furnace slag or its blends are added to the said pozzolan during or after said processing of the pozzolan.

According to another preferred embodiment Portland cement, fly ash Class F or C, fine quartz, granite quarry fines, fine fractions of recycled concrete or blast furnace slag or its blends are subjected to pregriding to achieve fineness with a retention on the sieve of 45 microns which is less than 5%.

According to still another preferred embodiment water reducing agents, set time regulators, and strength accelerating admixtures in powder form are added to the said pozzolan during or after said grinding of the pozzolan.

It is preferred that replacement of Portland cement by the said pozzolan in concrete or mortar is from 15 to about 70%.

It is also preferred that the pozzolans is subjected to grinding in said grinding equipment to a fineness of the final product with a retention on a sieve 30 microns being less than 5%.

Several embodiments of the invention have been described above. However, the present invention is not restricted to the exemplifying embodiments described above, but can be varied within the scope of the claims.

The invention claimed is:

1. A method for manufacturing of supplementary cementitious materials for replacement of Portland cement in production of mortars and concretes, where the supplementary cementitious materials comprise natural pozzolans in the form of rocks and ashes, comprising:
    subjecting said natural pozzolans in a crushed state to a high energetic mechanical processing by grinding in a grinding equipment, whereby the pozzolan particles receive mechanical impulses,
    wherein the grinding is carried out for a sufficient time to yield a test result according to ASTM C 109 for a compressive strength of a 2 inch side cube of mortar comprising 80% Portland cement and 20% of the supplementary cementitious material in a ratio of 1:2.75 to standard sand which after 28 days is 75% of the compressive strength of a comparative 2 inch side cube comprising a ratio of Portland cement:sand of 1:2.75, wherein
    the natural pozzolans after grinding has a final particle size distribution of
    ≤5 microns 15-50%,
    ≤10 microns 30-65%, and
    ≤30 microns 90-95%.

2. The method according to claim 1, wherein Portland cement, fly ash Class F or C, fine quartz, granite quarry fines, fine fractions of recycled concrete or blast furnace slag or its blends are added to said natural pozzolans during or after said processing of the natural pozzolans.

3. The method according to claim 1, wherein Portland cement, fly ash Class F or C, fine quartz, granite quarry fines, fine fractions of recycled concrete or blast furnace slag or its blends are subjected to pre-grinding to achieve fineness with a retention on a 45 microns sieve which is less than 5%.

4. The method according to claim 1, wherein water reducing agents, set time regulators, and strength accelerating admixtures in powder form are added to the natural pozzolans during or after said grinding of the natural pozzolans.

5. The method according to claim 1, wherein replacement of Portland cement by the natural pozzolans in concrete or mortar is from 15 to about 70 wt %.

6. The method according to claim 1, wherein the natural pozzolans are ground to a fineness with a retention on a 30 microns sieve being less than 5%.

7. The method according to claim 1, wherein the natural pozzolans are subjected by grinding in a grinding equipment, which is adopted to open or closed circuit for material being grinded.

8. The method according to claim 2, wherein Portland cement, fly ash Class F or C, fine quartz, granite quarry fines, fine fractions of recycled concrete or blast furnace slag or its blends are subjected to pre-grinding to achieve fineness with a retention on a 45 microns sieve which is less than 5%.

9. The method according to claim 2, wherein water reducing agents, set time regulators, and strength accelerating admixtures in powder form are added to the natural pozzolans during or after said grinding of the natural pozzolans.

10. The method according to claim 2, wherein replacement of Portland cement by the natural pozzolans in concrete or mortar is from 15 to about 70 wt %.

11. The method according to claim 2, wherein the natural pozzolans are subjected to grinding in said grinding equipment to a fineness with a retention on a 30 microns sieve being less than 5%.

12. A method for manufacturing of supplementary cementitious materials for replacement of Portland cement, comprising:
 grinding crushed natural pozzolans to yield a particle size distribution of
 ≤5 microns 15-50%,
 ≤10 microns 30-65%, and
 ≤30 microns 90-95%,
 wherein according to ASTM C 109 a sample of mortar comprising 80% Portland cement and 20% supplementary cementitious materials in a ratio of 1:2.75 to standard sand has ≥75% of a compressive strength compared to a sample having a ratio of Portland cement:sand of 1:2.75.

13. The method according to claim 12, wherein Portland cement, fly ash Class F or C, fine quartz, granite quarry fines, fine fractions of recycled concrete or blast furnace slag or its blends are added to said natural pozzolans during or after said processing of the natural pozzolans.

14. The method according to claim 12, wherein Portland cement, fly ash Class F or C, fine quartz, granite quarry fines, fine fractions of recycled concrete or blast furnace slag or its blends are subjected to pre-grinding to achieve fineness with a retention on a 45 microns sieve which is less than 5%.

15. The method according to claim 12, wherein water reducing agents, set time regulators, and strength accelerating admixtures in powder form are added to the natural pozzolans during or after said grinding of the natural pozzolans.

16. The method according to claim 12, wherein replacement of Portland cement by the natural pozzolans in concrete or mortar is from 15 to about 70%.

17. The method according to claim 12, wherein the natural pozzolans are ground to a fineness with a retention on a 30 microns sieve being less than 5%.

18. The method according to claim 1, wherein the natural pozzolans comprise at least one selected from the group consisting of diatomaceous earth, opaline chert, opaline shales, tuff, volcanic ash and pumicites.

19. The method according to claim 12, wherein the natural pozzolans comprise at least one selected from the group consisting of diatomaceous earth, opaline chert, opaline shales, tuff, volcanic ash and pumicites.

20. A method for manufacturing of supplementary cementitious materials for replacement of Portland cement, comprising:
 grinding crushed natural pozzolans to yield a particle size distribution of
 ≤5 microns 15-50%,
 ≤10 microns 30-65%, and
 ≤30 microns 90-95%,
 wherein according to ASTM C 109 a sample of mortar comprising 80% Portland cement and 20% supplementary cementitious materials in a ratio of 1:2.75 to standard sand has ≥75% of a compressive strength compared to a sample having a ratio of Portland cement:sand of 1:2.75, and
 the natural pozzolans comprise at least one selected from the group consisting of diatomaceous earth, opaline chert, opaline shales, tuff, volcanic ash and pumicites.

* * * * *